United States Patent Office
3,301,892
Patented Jan. 31, 1967

3,301,892
DIALKYL-2-ALKOXY-3,5,6,TRIHALO-
TEREPHTHALATES
Sidney B. Richter, Chicago, and Alfred A. Levin, Skokie, Ill., assignors to Velsicol Chemical Corporation, Chicago, Ill., a corporation of Illinois
No Drawing. Filed June 16, 1964, Ser. No. 375,654
9 Claims. (Cl. 260—473)

This invention relates to the production of new pesticidal compositions of matter. More specifically, this invention relates to new chemical compounds of the general formula:

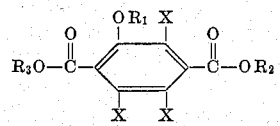

wherein X is halogen; $R_1$, $R_2$ and $R_3$ are independently selected from the group consisting of methyl and ethyl. While the halogen may be fluorine, chlorine, bromine or iodine; the preferred halogens are chlorine and bromine, a most preferred halogen is chlorine. These new compounds have been found to be useful as pesticides, particularly herbicides.

The compounds of this invention can be readily prepared from the appropriate tetrahaloterephthalic acid. For example, compounds wherein X is chlorine can be obtained from the known compound 2,3,5,6-tetrachloroterephthalic acid as the starting material. The tetrahaloterephthalic acid is dissolved in a suitable solvent such as methanol. This solution is combined with a sodium methoxide solution which is prepared by dissolving sodium in methanol. The preferred molar ratio of the sodium methoxide to the tetrachloroterephthalic acid is greater than 1:1, with a most preferred ratio of about 6:1. The combined solutions are heated preferably at superatmospheric pressure in an autoclave. The exact pressure to be used is not critical and is determined by the vapor pressure of the solvent employed at the reaction temperature. Similarly, the reaction temperature is not critical, but temperatures in the range of from about 100° C. to 200° C. are preferred, with a most preferred range of from about 140° C. to about 160° C. The reaction is complete when titration of an aliquot from the reaction mixture with silver nitrate indicates that one equivalent of chloride ion has been replaced, after which the contents are removed from the autoclave and any remaining solid residue is dissolved in water and added to the remainder of the mixture. This combined solution is filtered and the filtrate acidified with a suitable acid such as hydrochloric acid and then treated with ether. The ether extracts are combined and dried over a suitable drying agent such as magnesium sulfate. The drying agent is filtered off and the ether solution is stripped to yield a solid. This solid is then alkylated. The method of alkylation is chosen from a number of processes well known to the art such as treatment with a suitable dialkyl sulfate; a treatment with methyl chloride, and the like. Suitable sulfates which can be used for the purposes of the present invention in these methods of alkylation are dimethyl sulfate and diethyl sulfate. A detailed example of one of these processes follows. The solid is dissolved in acetone and to this solution is added potassium carbonate and a suitable sulfate, i.e., either dimethyl sulfate or diethyl sulfate. The mixture is then heated at reflux temperature with stirring for about 8 hours and is then cooled and filtered. The solvent is stripped to yield the alkylated solid product which can be purified by methods well known to the art such as crystallization, chromatography and the like.

In the preparation above, when methyl sulfate is employed the dimethyl ester with a methoxy substituent on the ring is produced. When ethyl sulfate is used, the resulting product is the diethyl ester with an ethoxy substituent on the ring. If one wishes to prepare compounds of the present invention with mixed methyl and ethyl groups such as the dimethyl ester with an ethoxy substituent on the ring or a diethyl ester with a methoxy on the ring then one must hydrolyze the diester to obtain the alkoxy trichloro diacid and then treat the ensuing diacid with the appropriate esterifying agent, e.g., methyl sulfate or ethyl sulfate.

It has been determined that the melting point of dimethyl 2-methoxy-3,5,6-trichloroterephthalate is 84° C. to 85° C.

EXAMPLE 1

Preparation of 2-hydroxy-3,5,6-trichloroterephthalic acid

A 60 ml. portion of a solution of 2,3,5,6-tetrachloroterephthalic acid (20.0 g.; 0.066 mole) dissolved in methanol (100 ml.) was combined with 60 ml. of a solution of sodium methoxide which was prepared by dissolving sodium (9.1 g.; 0.4 mole) in methanol (100 ml.). The combined solutions were placed in an autoclave and heated under superatmospheric pressure at a temperature maintained between 145° C. and 155° C. After 32 hours of heating, titration of an aliquot of the reaction mixture indicated that one equivalent of chloride ion had been replaced and the contents were therefore removed from the autoclave. A solid residue which was found when the autoclave was opened, was dissolved in water and added to the remainder of the mixture from the autoclave. This combined solution was filtered and the filtrate was acidified to Congo red with hydrochloric acid. The solution was then treated twice with 250 ml. portions of ether. The ether extracts were combined and dried over magnesium sulfate. The drying agent was filtered off and the ether solution was stripped to yield 8.5 g. of an off-white solid which was recrystallized from toluene. The solid melted with decomposition at 248° C.

Analysis for $C_8H_3Cl_3O_5$.—Theory, percent: C, 33.66; H, 1.06. Found, percent: C, 3.97; H, 1.24.

EXAMPLE 2

Preparation of dimethyl-2-methoxy-3,5,6-trichloroterephthalate

A mixture of 2-hydroxy-3,5,6-trichloroterephthalic acid (7.5 g.; 0.026 mole), acetone (150 ml.), dimethyl sulfate (15 ml.; 0.16 mole) and potassium carbonate (15.6 g.; 0.1 mole) were placed in a 250 ml. round bottom flask fitted with a mechanical stirrer and reflux condenser. The mixture was heated at reflux, with stirring, overnight. It was then cooled, filtered, and the solvent was stripped to yield a solid. The solid was then crystallized and recrystallized from methanol to yield a white solid. In order to further purify the product, it was dissolved in benzene and chromatographed through a column of 300 g. of Florex XXS fuller's earth with benzene and then mixtures of benzene-ether as the eluants. The seventh fractions which came off the column in benzene-ether (90:10) was taken up in methanol and allowed to crystallize. The crystals were filtered, sucked dry, and dried overnight in the Abderhalden apparatus.

Analysis for $C_{11}H_9Cl_3O_5$.—Theory, percent: C, 40.33; H, 2.77. Found, percent: C, 39.80; H, 2.86.

EXAMPLE 3

*Preparation of 2-hydroxy-3,5,6-tribromoterephthalic acid*

A 60 ml. portion of a solution of 2,3,5,6-tetrabromoterephthalic acid (23 g.; 0.066 mole) dissolved in methanol (100 ml.) is combined with 60 ml. of a solution of sodium methoxide which is prepared by dissolving sodium in (9.1 g.; 0.4 mole) in methanol (100 ml.). The combined solutions are placed in an autoclave and heated under superatmospheric pressure for about 32 hours at a temperature maintained between 145° C. and 155° C. The contents are removed from the autoclave. Any solid residue is dissolved in water and added to the remainder of the mixture from the autoclave. The combined solution is filtered and the filtrate is acidified to Congo red with hydrochloric acid. The solution is then treated twice with 250 ml. portions of ether. The ether extracts are combined and dried over magnesium sulfate. The drying agent is filtered off and the ether solution is stripped to yield 2-hydroxy-3,5,6-tribromoterephthalic acid.

EXAMPLE 4

*Preparation of dimethyl-2-methoxy-3,5,6-tribromoterephthalate*

A mixture of 2-hydroxy-3,5,6-tribromoterephthalic acid (9.05 g.; 0.026 mole), acetone (150 ml.), dimethyl sulfate (15 ml.; 0.16 mole) and potassium carbonate (15.6 g.; 0.1 mole) are placed in a 250 ml. round bottom flask fitted with a mechanical stirrer and reflux condenser. The mixture is heated at reflux with stirring overnight. It is then cooled and filtered and the solvent is stripped to yield a solid. The solid is then crystallized and recrystallized from methanol and finally chromatographed through Florex XXS fuller's earth to purify the dimethyl-2-methoxy-3,5,6-tribromoterephthalate.

Other compounds within the scope of the invention can be prepared in a manner similar to that described in the above examples. In the following examples the reactants used to prepare the indicated named compounds of this invention are given.

EXAMPLE 5

2-hydroxy-3,5,6-trichloroterephthalic acid is reacted with diethyl sulfate to yield diethyl-2-ethoxy-3,5,6-trichloroterephthalate.

EXAMPLE 6

Dimethyl-2-methoxy-3,5,6-trichloroterephthalate is reacted with sodium hydroxide to hydrolyze the ester and then this compound is treated with diethyl sulfate to yield diethyl-2-methoxy-3,5,6-trichloroterephthalate.

EXAMPLE 7

Diethyl-2-ethoxy-3,5,6-trichloroterephthalate is reacted with sodium hydroxide to hydrolyze the ester and then the solution is treated with dimethyl sulfate to yield dimethyl-2-ethoxy-3,5,6-trichloroterephthalate.

EXAMPLE 8

2-hydroxy-3,5,6-tribromoterephthalic acid is reacted with diethyl sulfate to yield diethyl-2-ethoxy-3,5,6-tribromoterephthalate.

EXAMPLE 9

Dimethyl-2-methoxy-3,5,6-tribromoterephthalate is reacted with sodium hydroxide to hydrolyze the ester and then this compound is treated with diethyl sulfate to yield diethyl-2-methoxy-3,5,6-tribromoterephthalate.

EXAMPLE 10

Diethyl-2-ethoxy-3,5,6-tribromoterephthalate is reacted with sodium hydroxide to hydrolyze the ester and then this compound is treated with diethyl sulfate to yield dimethyl-2-ethoxy-3,5,6-tribromoterephthalate.

For practical use as herbicides, the compounds of this invention are generally incorporated into herbicidal compositions which comprise an inert carrier and a herbicidally toxic amount of such a compound. Such herbicidal compositions, which are usually known in the art as formulations, enable the active compound to be applied conveniently to the site of the weed infestation in any desired quantity. These compositions can be solids such as dusts, granules, or wettable powders; or they can be liquids such as solutions or emulsifiable concentrates.

For example, dusts can be prepared by grinding and blending the active compound with a solid inert carrier such as the talcs, clays, silicas, pyrophyllite, and the like. Granular formulations can be prepared by impregnating the compound, usually dissolved in a suitable solvent, on to and into granulated carriers such as the attapulgites or the vermiculites, usually of a particle size range of from about 0.3 to 1.5 mm. Wettable powders, which can be dispersed in water to any desired concentration of the active compound, can be prepared by incorporating wetting agents into concentrated dust compositions.

In some cases the active compounds are sufficiently soluble in common organic solvents such as kerosene or xylene so that they can be used directly as solutions in these solvents. However, preferred liquid herbicidal compositions are emulsifiable concentrates, which comprise an active compound according to this invention and as the inert carrier, a solvent and an emulsifier. Such emulsifiable concentrates can be diluted with water to any desired concentration of active compound for application as sprays to the site of the weed infestation. The emulsifiers most commonly used in these concentrates are nonionic or mixtures of nonionic with anionic surface-active agents.

A typical herbicidal composition according to this invention is illustrated by the following example, in which the quantities are in parts by weight.

EXAMPLE 11

| | |
|---|---|
| Product of Example 2 | 10 |
| Powdered talc | 90 |

The above ingredients are mixed in a mechanical grinder-blender and are ground until a homogeneous, free-flowing dust of the desired particle size is obtained. This dust is suitable for direct application to the site of the weed infestation.

The herbicides of this invention can be applied in any manner recognized by the art. The concentration of the new compounds of this invention in the herbicidal compositions will vary greatly with the type of formulation and the purpose for which it is designed, but generally the herbicidal compositions will comprise from about 0.05 to about 95 percent by weight of the active compounds of this invention. In a preferred embodiment of this invention, the herbicidal compositions will comprise from about 5 to about 75 percent by weight of the active compound. The compositions can also comprise such additional substances as other pesticides, spreaders, adhesives, stickers, fertilizers, activators, synergists, and the like.

Weeds are undesirable plants in their growing where they are not wanted, having no economic value, and interfering with the production of cultivated crops or with the welfare of livestock. Many types of weeds are known, including annuals such as pigweed, lambsquarters, yellow foxtail, crabgrass, wild mustard, French-weed, rye-grass, goose-grass, chickweed, and smartweed; biennials such as wild carrot, great burdock, mullein, round-leaved mallow, blue thistle, bull thistle, hounds-tongue, moth mullein, and purple star thistle; or perennials such as white cockle, perennial rye-grass, quackgrass, Johnson grass, Canada thistle, hedge bindweed, Bermuda grass, sheep sorrel, field chickweed, and winter-cress. Similarly, such weeds can be classified as board-leaf or grassy weeds. It is economically desirable to control the growth of such weeds without damaging beneficial plants or livestock.

The new compounds of this invention are particularly valuable for weed control because they are toxic to many species and groups of weeds while they are relatively non-toxic to many beneficial plants. The method of this invention for the control of weeds comprises contacting said weeds with a herbicidal composition comprising an inert carrier and as the essential active ingredient, in a quantity which is herbicidally toxic to said weeds, a compound of this invention. The exact amount of compound required will depend on a variety of factors, including the hardiness of the particular weed species, weather, method of application, the kind of beneficial plants in the same area, and the like. Thus, while the application of up to only about one or two ounces of an active compound per acre may be sufficient for good control of a light infestation of weeds growing under adverse conditions, the application of one pound or more of active compound per acre may be required for good control of a dense infestation of hardy weeds growing under favorable conditions.

The herbicidal toxicity of the new compounds of this invention can be illustrated by many of the established testing techniques known to the art. For example, in one series of experiments test compounds formulated as aqueous emulsions were sprayed at various dosages on the surface of soil which had been seeded less than twenty-four hours earlier with seeds of crop plants and weeds. After spraying, the soil containers were placed in a greenhouse and provided with supplementary light and heat as required and daily or more frequent watering. The severity of injury was rated on a 0 to 10 scale as follows: 0=no injury; 1, 2=slight injury; 3, 4=moderate injury; 5, 6=moderately severe injury; 7, 8, 9=severe injury; 10=death. In these pre-emergence tests, dimethyl-2-methoxy-3,5,6-tricholoroterephthalate showed strong activity against the annual grasses. For example, at concentrations as low as 1 lb./acre this compound caused injury rated at 8 on barnyard grass, 6 on crabgrass, and 9 on foxtail; at 4 lbs./acre the injury ratings were 9 on barnyard grass, 10 on crabgrass, and 9 on foxtail. These results were particularly significant since the compound showed a great deal of selectivity. It was safe to corn, cotton, rice, safflower, soybeans and wheat.

Another series of tests which were run, to show the post-emergence toxicity of the compounds of this invention to weeds was to formulate the test compounds as aqueous emulsions and to spray them at various dosages on the foliage of the weeds that have attained a prescribed size. After being sprayed the weeds were placed in a greenhouse and watered daily or more frequently. Water was not applied to the foliage of the treated weeds. The severity of injury was determined 13 days after the plants were treated. At that time, it was discovered that in this post-emergence treatment that dimethyl 2-methoxy-3,5,6-trichloroterephthalate caused injury to barnyard grass at a concentration of 4 lbs./acre rated at 7 on the aforementioned injury rating scale and at the same concentration, this compound showed an injury rating of 6 on crabgrass, one of the hardiest and most troublesome weed pests. A comparison of the results of these tests when dimethyl 2,3,5,6-tetraterephthalate, a known compound, was used as the test compound indicates the surprising and unexpected nature of the present results. At a concentration of 4 lbs./acre the 2,3,5,6 - tetrachloroterephthalate caused no injury when applied to barnyard grass and injury rated at only 1 when applied to crabgrass.

We claim:
1. A compound of the formula:

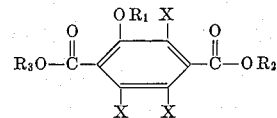

wherein X is halogen; $R_1$, $R_2$, and $R_3$ are independently selected from the group consisting of methyl and ethyl.
2. Dimethyl-2-methoxy-3,5,6-trichloroterephthalate.
3. Diethyl-2-ethoxy-3,5,6-trichloroterephthalate.
4. Dimethyl-2-ethoxy-3,5,6-trichloroterephthalate.
5. Diethyl-2-methoxy-3,5,6-trichloroterephthalate.
6. Dimethyl-2-methoxy-3,5,6-tribromoterephthalate.
7. Diethyl-2-ethoxy-3,5,6-tribromoterephthalate.
8. Dimethyl-2-ethoxy-3,5,6-tribromoterephthalate.
9. Diethyl-2-methoxy-3,5,6-tribromoterephthalate.

References Cited by the Examiner

UNITED STATES PATENTS

| 2,396,513 | 3/1946 | Jones | 71—2.6 |
| 2,557,639 | 5/1951 | Derr et al. | 260—475 |
| 2,782,225 | 2/1957 | Jones | 260—475 |
| 2,893,855 | 7/1959 | Smith | 71—2.6 |

FOREIGN PATENTS

| 1,265,053 | 8/1960 | France. |

LORRAINE A. WEINBERGER, *Primary Examiner.*

JAMES O. THOMAS, JR., *Examiner.*

A. J. ADAMCIK, S. B. WILLIAMS,
*Assistant Examiners.*